United States Patent
Benazzi et al.

(10) Patent No.: US 6,387,246 B1
(45) Date of Patent: *May 14, 2002

(54) CATALYST THAT COMPRISES A PARTIALLY AMORPHOUS Y ZEOLITE AND ITS USE IN HYDROCONVERSION OF HYDROCARBON PETROLEUM FEEDSTOCKS

(75) Inventors: Eric Benazzi, Chatou; Jean-Marie Deves, Vernouillet; Bernadette Rebours, Ermont; Frédéric Chaigne, Beauvoir sur Mer; Tivadar Cseri, Courbevoie; Slavik Kasztelan, Rueil Malmaison, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/572,970

(22) Filed: May 18, 2000

(30) Foreign Application Priority Data

May 19, 1999 (FR) ............................................. 99 06449
May 19, 1999 (FR) ............................................. 99 06447

(51) Int. Cl.⁷ ........................ C01G 47/18; C01G 47/20; B01J 29/12; B01J 29/14; B01J 29/16
(52) U.S. Cl. ............................... 208/111.01; 208/111.3; 208/111.35; 502/64; 502/66; 502/74; 502/79
(58) Field of Search .............................. 502/60, 64, 66, 502/74, 79; 208/111.01, 111.3, 111.35

(56) References Cited

U.S. PATENT DOCUMENTS

| | | | |
|---|---|---|---|
| 3,640,681 A | * | 2/1972 | Pickert |
| 3,867,310 A | | 2/1975 | Elliott, Jr. et al. |
| 3,886,094 A | | 5/1975 | Pilato et al. |
| 4,481,104 A | * | 11/1984 | Walsh |
| 4,515,681 A | * | 5/1985 | Cody |
| 4,570,027 A | * | 2/1986 | Boucher et al. |
| 4,663,025 A | * | 5/1987 | Fu |
| 4,777,157 A | * | 10/1988 | Koepke et al. |
| 4,980,328 A | * | 12/1990 | Kukes et al. |
| 5,275,994 A | * | 1/1994 | Weissman et al. |
| 5,393,409 A | * | 2/1995 | Jan et al. |
| 5,785,944 A | * | 7/1998 | Miller |
| 5,972,832 A | * | 10/1999 | Shi et al. |
| 6,171,474 B1 | * | 1/2001 | Kasztelan et al. |
| 6,174,429 B1 | * | 1/2001 | George-Mecrhal et al. |

FOREIGN PATENT DOCUMENTS

| | | | |
|---|---|---|---|
| EP | 0 967 010 | | 12/1999 |
| EP | 0 967 012 | | 12/1999 |
| FR | 2 758 278 | | 7/1998 |
| GB | 1390359 | * | 4/1975 |

* cited by examiner

Primary Examiner—Steven P. Griffin
Assistant Examiner—Christina Ildebrando
(74) Attorney, Agent, or Firm—Millen, White, Zelano & Branigan, P.C.

(57) ABSTRACT

The invention relates to a catalyst that contains at least one matrix, a partially amorphous Y zeolite, optionally at least one metal that is selected from the group that is formed by the metals of group VIB and group VIII of the periodic table, optionally at least one element that is selected from the group that is formed by phosphorus, boron and silicon, optionally at least one element of group VIIA, and optionally at least one element of group VIIB. The partially amorphous Y zeolite has a peak rate that is less than 0.4, and a crystalline fraction that is expressed relative to a reference zeolite in sodium form and that is less than 60%. The invention also relates to the use of this catalyst in hydroconversion, in particular hydrocracking and hydrorefining of hydrocarbon feedstocks.

19 Claims, No Drawings

CATALYST THAT COMPRISES A PARTIALLY AMORPHOUS Y ZEOLITE AND ITS USE IN HYDROCONVERSION OF HYDROCARBON PETROLEUM FEEDSTOCKS

This invention relates to a catalyst that contains at least one matrix, a partially amorphous Y zeolite, optionally at least one hydro-dehydrogenating metal, preferably selected from the group that is formed by the metals of group VIB and group VIII of the periodic table, optionally at least one element that is selected from the group that is formed by phosphorus, boron and silicon, optionally at least one element of group VIIA, and optionally at least one element of group VIIB. The invention also relates to the use of this catalyst in hydroconversion, in particular hydrocracking of the hydrocarbon feedstocks and very particularly for obtaining high viscosity oils that have viscosity numbers (VI) that are greater than 95–100, preferably between 95–150 and more particularly between 120–140.

The catalyst can also be used in hydrorefining hydrocarbon feedstocks.

The hydrocracking of heavy petroleum fractions is a very important refining process that makes it possible to produce, starting from excess heavy feedstocks that cannot be readily upgraded, lighter fractions such as gasolines, jet fuels and light gas oils that the refiner seeks to adapt his production to the structure of the demand. Certain hydrocracking processes make it possible also to obtain a greatly purified residue that can constitute excellent bases for oils. Relative to the catalytic cracking, the advantage of the catalytic hydrocracking is to provide middle distillates, jet fuels and gas oils of very good quality. The gasoline that is produced has a much lower octane number than the one that is obtained from the catalytic cracking.

The catalysts that are used in hydrocracking are all of bifunctional type that link an acid function to a hydrogenating function. The acid function is provided by large-surface substrates (generally 150 to 800 $m^2 \cdot g^{-1}$) that have a surface acidity, such as halogenated aluminas (in particular chlorinated or fluorinated), combinations of boron oxides and aluminum oxides, amorphous silica-aluminas and zeolites. The hydrogenating function is provided either by one or several metals of group VIII of the periodic table, or by a combination of at least one metal of group VIB of the periodic table and at least one metal of group VIII.

The balance between the two acid and hydrogenating functions is the basic parameter that controls the activity and the selectivity of the catalyst. A weak acid function and a strong hydrogenating function provide catalysts that are not very active and that work at a temperature that is generally high (greater than or equal to 390° C.) and at a low feed volumetric flow rate (the VVH expressed by volume of feedstock to be treated per unit of volume of catalyst and per hour is generally less than or equal to 2 $h^{-1}$) but provided with very good selectivity of middle distillates. Conversely, a strong acid function and a weak hydrogenating function provide catalysts that are active but that have less favorable selectivities of middle distillates. The search for a suitable catalyst will therefore be centered on a judicious choice of each of the functions for adjusting the activity/selectivity pair of the catalyst.

Thus, one of the great advantages of the hydrocracking is to exhibit a great flexibility at various levels: flexibility with regard to the catalysts used, which brings about flexibility of the feedstocks that are to be treated and with regard to products that are obtained. An easy parameter to control is the acidity of the substrate of the catalyst.

The conventional catalysts for catalytic hydrocracking, for the large majority, consist of weakly acidic substrates, such as amorphous silica-aluminas, for example. These systems are used more particularly for producing middle distillates of very good quality and also oil bases when their acidity is very weak.

The family of amorphous silica-aluminas is found in slightly acid substrates. Many catalysts of the hydrocracking market have a silica-alumina base combined either with a metal of group VIII or, preferably when the heteroatomic poison contents of the feedstock to be treated exceed 0.5% by weight, with a combination of sulfides of the metals of groups VIB and VIII. These systems have very good selectivity in middle distillates, and the products that are formed are of good quality. These catalysts, for the less acidic among them, can also produce lubricating bases. The drawback of all of these catalytic systems with an amorphous substrate base is their weak activity, as mentioned.

The catalysts that comprise the FAU-structural-type Y zeolite or the beta-type catalysts have a higher catalytic activity than those of the amorphous silica-aluminas but have higher selectivities in light products.

Hydrotreatment takes on increasing importance in the practice of refining with the growing necessity to reduce the amount of sulfur in the petroleum fractions and to convert heavy fractions into lighter fractions that can be upgraded as fuels. This results in, on the one hand, the growing demand for fuels that requires converting increasingly rich imported crude oils into heavy fractions and into heteroatoms, including nitrogen and sulfur, and, on the other hand, specifications that are imposed on the contents of sulfur and aromatic compounds in various countries for commercial fuels. This upgrading involves a relatively significant reduction of the molecular weight of the heavy components, which can be obtained with, for example, cracking reactions.

The current processes for catalytic hydrorefining use catalysts that can promote the main reactions that are useful for exploiting heavy fractions, in particular the hydrogenation of the aromatic cores (HAR), hydrodesulfurization (HDS), hydrodenitrating (HDN) and other hydroeliminations. Hydrorefining is used to treat feedstocks such as gasolines, gas oils, vacuum gas oils, residues under conditions of atmosphere or a vacuum that may or may not be deasphalted. For example, cracking and catalytic hydrocracking processes are indicated for the pretreatment of the feedstocks. The nitrogen-containing heterocyclic compounds that are encountered in the heavy fractions act as poisons with very marked toxicity for the cracking or hydrocracking catalysts. Consequently, the denitrating of the catalytic hydrocracking feedstocks constitutes one of the possible means for improving the overall yield of these processes, and it is then desirable to reduce as much as possible the nitrogen content of the feedstocks before cracking them. At least one hydrorefining stage is usually integrated into each of the known diagrams for upgrading heavy petroleum fractions.

In the prior art, the zeolites used for the preparation of hydrocracking catalysts are characterized by several magnitudes like their $SiO_2/Al_2O_3$ framework molar ratio, their crystalline parameter, their pore distribution, the specific surface area, their sodium ion uptake capacity, or else their capacity for adsorption of water vapor. Thus, the above patents of the applicant (French Patents FR-A-2,754,742 and FR-A-2,754,826) use a zeolite whose crystalline parameter is between 24.15 and 24.38 Å (1 Å=0.1 nm), the $SiO_2/Al_2O_3$ framework molar ratio between 500 and 21, the sodium content less than 0.15% by weight, the sodium ion uptake capacity greater than 0.85 g of Na/100 g of zeolite, the specific surface area greater than 400 m2/g, the adsorption capacity of the water vapor greater than 6%, and 1 to 20% of the pore volume is contained in the pores with a diameter of between 20 and 80 Å.

U.S. Pat. No. 4,857,170 describes the use in hydrocracking of a modified zeolite with a crystalline parameter that is less than 24.35 Å but on whose degree of crystallinity there is no effect from the modifying treatments.

Moreover, the prior art shows that an effort has always been made to maintain crystalline fractions (or degree of crystallinity) and high peak rates in the zeolites that are used.

The research work that is carried out by the applicant on numerous zeolites and microporous solids led him to discover that, on the contrary and surprisingly enough, a catalyst that contains at least one FAU-structural-type Y zeolite, partially crystallized, makes it possible to achieve middle distillate selectivities (kerosene and gas oil) that are clearly improved relative to the catalysts that contain a Y zeolite that are known in the prior art.

In addition, the same work made it possible for the applicant to note that, surprisingly enough, Y zeolite samples that are modified differently although they have characteristics that are identical or very close to those that are cited in the prior art, can in contrast exhibit different peak rates and different crystalline fractions and have different reactivities.

More specifically, the invention has as its object a catalyst that comprises at least one matrix and optionally at least one element that is selected from the group that is formed by the elements of group VIII and group VIB, whereby said catalyst is characterized in that it contains a partially amorphous Y zeolite.

A partially amorphous Y zeolite, used in this invention, is defined as a solid that has i/a peak rate that is less than 0.40, preferably less than about 0.30, ii/a crystalline fraction that is expressed relative to a reference Y zeolite in sodium form (Na) that is less than about 60%, preferably less than about 50%.

The solid, partially amorphous Y zeolites that preferably are part of the composition of the catalyst according to the invention have at least one (and preferably all) of the other following characteristics:

iii/an overall Si/Al ratio that is greater than 15, preferably greater than 20 and less than 150, iv/an Si/Allv framework ratio that is greater than or equal to the overall Si/Al ratio, v/a pore volume that is at least equal to 0.20 ml/g of solid whose fraction, between 8% and 50%, consists of pores that have a diameter of at least 5 nm (nanometer) or 50 Å, vi/a specific surface area of 210–800 m$^2$/g, preferably 250–750 m$^2$/g and advantageously 300–600 m$^2$/g.

The peak rates and the crystalline fractions are determined by x-ray diffraction by using a procedure that is derived from the ASTM D3906-97 method "Determination of Relative X-ray Diffraction Intensities of Faujasite-Type-Containing Materials." It is possible to refer to this method for the general conditions of application of the procedure, and, in particular, for the preparation of samples and references.

A diffractogram consists of lines that are characteristic of the crystallized fraction of the sample and a bottom, essentially produced by the diffusion of the amorphous or microcrystalline fraction of the sample (a weak diffusion signal is linked to the equipment, air, sample holder, etc.) The peak rate of a zeolite is the ratio, in a predefined angular zone (typically 8 to 40° 2θ when Kα radiation of copper is used, 1=0.154 nm), of the area of the lines of the zeolite (peaks) to the overall area of the diffractogram (peaks+trough). This peaks/(peaks+trough) ratio is proportional to the amount of crystallized zeolite in the material.

To estimate the crystalline fraction of a Y zeolite sample, the peak rate of the sample will be compared to that of a reference that is considered as being 100% crystallized (NaY, for example). The peak rate of a perfectly crystallized NaY zeolite is on the order of 0.55 to 0.60.

The peak rate of a standard USY zeolite is 0.45 to 0.55; its crystalline fraction relative to a perfectly crystallized NaY is 80 to 95%. The peak rate of the solid that is the object of this invention is less than 0.4 and preferably less than 0.35. Its crystalline fraction is therefore less than 70%, preferably less than 60%.

The partially amorphous zeolites are prepared according to the techniques that are generally used for dealuminification, starting from commercially available Y zeolites, i.e. that generally have high crystallinities (at least 80%). More generally, it will be possible to start from zeolites that have a crystalline fraction of at least 60% or at least 70%.

The Y zeolites that are used generally in the hydrocracking catalysts are produced by modification of the Na—Y zeolite that is available commercially. This modification makes it possible to end in so-called stabilized, ultra-stabilized or else dealuminified zeolites. This modification is carried out by at least one of the dealuminification techniques, and, for example the hydrothermic treatment, the acid attack. Preferably, this modification is carried out by combination of three types of operations that are known to one skilled in the art: hydrothermic treatment, ion exchange and acid attack. The hydrothermic treatment is perfectly defined by the union of operating variables, such as temperature, duration, total pressure and partial pressure of water vapor. This treatment has the effect of extracting the silico-aluminum framework of the zeolite of the aluminum atoms. The consequence of this treatment is an increase in the SiO2/Al2O3 framework molar ratio and a reduction of the parameter of the crystalline mesh.

The ion exchange takes place generally by immersion of the zeolite into an aqueous solution that contains ions that are able to be fixed on the cationic exchange sites of the zeolite. The sodium cations that are present in the zeolite after crystallization are also removed.

The acid attack operation consists in bringing the zeolite into contact with an aqueous solution of a mineral acid. The severity of the acid attack is adjusted by the acid concentration, the duration and the temperature. Carried out on a zeolite that is treated hydrothermically, this treatment has the effect of eliminating the aluminum radicals that are extracted from the framework and that plug the micropores of the solid The partially amorphous Y zeolite that is used in the catalysts according to the invention is at least in part in hydrogen form or acid (H+) form or ammonium (NH4+) form or cationic form, whereby said cation is selected from the group that is formed by the groups IA, IB, IIA, IIB, IIIA, IIIB (including rare earths), Sn, Pb and Si; it is preferably at least in part in H+ form and it can also be used at least in part in cationic form (as defined above).

The partially amorphous Y zeolite that is at least partly in acid form (and preferably in H form in its entirety) or partially exchanged with cations, for example alkaline cations and/or alkaline-earth cations, will preferably be used.

The catalyst that comprises at least one partially amorphous Y zeolite also contains a hydrogenating function. The hydrogenating function as it was defined above preferably comprises at least one metal that is selected from the group that is formed by the metals of group VIB and group VIII of the periodic table.

The catalyst of this invention can contain at least one noble or non-noble element of group VIII, such as iron, cobalt, nickel, ruthenium, rhodium, palladium, osmium, iridium or platinum. Among the metals of group VIII, it is preferred to use non-noble metals such as iron, cobalt, and nickel. The catalyst according to the invention can contain at least one element of group VIB, preferably tungsten and molybdenum. The combinations of the following metals are advantageously used: nickel-molybdenum, cobalt-molybdenum, iron-molybdenum, iron-tungsten, nickel-tungsten, cobalt-tungsten, and the preferred combinations are: nickel-molybdenum, cobalt-molybdenum, and nickel-tungsten. It is also possible to use combinations of three metals, for example nickel-cobalt-molybdenum.

The catalyst of this invention also contains at least one oxide-type amorphous or poorly crystallized porous mineral matrix. It is possible to cite aluminas, silicas, and silica-aluminas by way of non-limiting example. It is also possible to select aluminates. It is preferred to use matrices that contain alumina under all of these forms that are known to one skilled in the art and even more preferably the aluminas, for example the gamma-alumina.

In an implementation of the invention, the catalyst preferably contains at least one element that is selected from the group that is formed by boron, silicon and phosphorus. The catalyst also contains at least one element of group VIIA, preferably chlorine and fluorine, and also optionally at least one element of group VIIB.

The boron, silicon and/or phosphorus can be in the matrix, the zeolite or are preferably deposited on the catalyst and then mainly located on the matrix.

The element that is introduced, and in particular the silicon that is mainly located on the matrix of the substrate, can be characterized by techniques such as the Castaing microprobe (distribution profile of various elements), the electronic microscopy by transmission coupled to an X analysis of the components of the catalysts or else by the establishment of a distribution cartography of elements that are present in the catalyst by electronic microprobe.

The catalyst of this invention generally contains in % by weight relative to the total mass of the catalyst:

0 to 60%, advantageously 0.1 to 60%, preferably 0.1 to 50% and even more preferably 0.1 to 40%, of at least one hydro-dehydrogenating metal, preferably selected from the group that is formed by the metals of group VIB and group VIII, 0.1 to 99.9% and preferably 0.1 to 99.8% or 99.7% or 99.6% or 99%, preferably 1 to 98% of at least one oxide-type amorphous or poorly crystallized porous mineral matrix, said catalyst also contains 0.1 to 99.9%, preferably 0.1 to 99.8% or 99%, preferably 0.1 to 90%, preferably 0.1 to 80% of partially amorphous Y zeolite, whereby said catalyst optionally contains 0 to 20%, preferably 0.1 to 15% and even more preferably 0.1 to 10% of at least one promoter element that is selected from the group that is formed by silicon, boron and phosphorus, and preferably boron and/or silicon, 0 to 20%, preferably 0.1 to 15% and even more preferably 0.1 to 10% of at least one element that is selected from group VIIA, preferably fluorine, 0 to 20%, preferably 0.1 to 15% and even more preferably 0.1 to 10% of at least one element that is selected from group VIIB.

The metals of group VIB, group VIII and group VIIB of the catalyst of this invention can be present completely or partially in metallic form and/or oxide form and/or sulfide form.

This catalyst can be prepared by any methods that are well known to one skilled in the art. It is advantageously obtained by mixing the matrix and the zeolite, and then the mixture is shaped. The hydrogenating element is introduced during the mixing or preferably after shaping. The shaping is followed by calcination, and the hydrogenating element is introduced before or after this calcination. The preparation ends with calcination at a temperature of 250 to 600° C. One of the preferred methods according to this invention consists in mixing the partially amorphous Y zeolite powder in a moist alumina gel for several tens of minutes, then in passing the paste that is thus obtained through a die to form extrudates with a diameter of between 0.4 and 4 mm.

The hydrogenating function can be introduced in part only (case, for example, of combinations of oxides of metals of groups VIB and VIII) or completely at the time of mixing of the zeolite, i.e., the partially amorphous Y zeolite, with the oxide gel that is selected as a matrix.

The hydrogenating function can be introduced by one or more ion exchange operations on the calcined substrate that consists of a partially amorphous Y zeolite that is dispersed in the selected matrix with solutions that contain the precursor salts of the selected metals.

The hydrogenating function can be introduced by one or more impregnation operations of the substrate that is shaped and calcined by a solution that contains at least one precursor of at least one oxide of at least one metal that is selected from the group that is formed by the metals of groups VIII and the metals of group VIB, whereby the precursor(s) of at least one oxide of at least one metal of group VIII is preferably introduced after those of group VIB or at the same time as the latter, if the catalyst contains at least one metal of group VIB and at least one metal of group VIII.

In the case where the catalyst contains at least one element of group VIB, for example, molybdenum, it is possible, for example, to impregnate the catalyst with a solution that contains at least one element of group VIB, to dry it and to calcine it. The impregnation of the molybdenum can be facilitated by adding phosphoric acid in the solutions of ammonium paramolybdate, which makes it possible also to introduce the phosphorus to promote the catalytic activity.

In a preferred embodiment of the invention, the catalyst contains as promoter at least one element that is selected from among silicon, boron and phosphorus. These elements are introduced on a substrate that already contains at least one partially amorphous Y zeolite, at least one matrix, as defined above, and at least one metal that is selected from the group that is formed by the metals of group VIB and the metals of group VIII.

In the case where the catalyst contains boron, silicon and phosphorus and optionally the element that is selected from group VIIA of the halide ions and optionally at least one element that is selected from group VIIB, these elements can be introduced into the catalyst at various levels of the preparation and various manners.

The impregnation of the matrix is preferably carried out by the so-called "dry" impregnation method that is well known to one skilled in the art. The impregnation can be carried out in a single stage by a solution that contains all of the constituent elements of the final catalyst.

The P, B, Si and the element that is selected from among the halide ions of group VIIA can be introduced by one or more impregnation operations with excess solution on the calcined precursor.

In the case where the catalyst contains boron, a preferred method according to the invention consists in preparing an aqueous solution of at least one boron salt such as ammonium biborate or ammonium pentaborate in an alkaline medium and in the presence of oxidized water and in initiating a so-called dry impregnation, in which the volume of the pores of the precursor is filled by the solution that contains boron.

In the case where the catalyst contains silicon, a solution of a compound of the silicone-type silicon will be used.

In the case where the catalyst contains boron and silicon, the deposit of boron and silicon can also be done simultaneously by using a solution that contains a boron salt and a silicone-type silicon compound. Thus, for example, in the case where, for example, the precursor is a nickel-molybdenum-type catalyst that is supported on a substrate that contains the partially amorphous Y zeolite and alumina, it is possible to impregnate this precursor by the aqueous solution of ammonium biborate and the Rhodorsil ElP silicone of the Rhône-Poulenc Company, to initiate drying at, for example, 80° C., then to impregnate by an ammonium fluoride solution, to initiate drying at, for example, 80° C., and to initiate calcination for example and preferably under air in a flushed bed, for example at 500° C. for 4 hours.

In the case where the catalyst contains at least one element of group VIIA, preferably fluorine, it is possible, for example, to impregnate the catalyst by an ammonium fluoride solution, to initiate drying for example at 80° C. and to initiate calcination for example and preferably under air in a flushed bed, for example at 500° C. for 4 hours.

Other impregnation sequences can be used to obtain the catalyst of this invention.

In the case where the catalyst contains phosphorus, it is possible, for example, to impregnate the catalyst with a solution that contains phosphorus, to dry it and to calcine it.

In the case where the elements that are contained in the catalyst, i.e., at least one metal that is selected from the group that is formed by the metals of group VIII and group VIB, optionally boron, silicon, phosphorus, at least one element of group VIIA, and at least one element of group VIIB are introduced into several impregnations of the corresponding precursor salts, an intermediate drying stage of the catalyst is generally carried out at a temperature that is generally between 60 and 250° C., and an intermediate calcination stage of the catalyst is generally carried out at a temperature of between 250 and 600° C.

To end the preparation of the catalyst, the moist solid is allowed to rest under a moist atmosphere at a temperature of between 10 and 80° C., then the moist solid that is obtained is dried at a temperature of between 60 and 150° C., and finally the solid that is obtained is calcined at a temperature of between 150 and 800° C.

The sources of elements of group VIB that can be used are well known to one skilled in the art. For example, among the sources of molybdenum and tungsten, it is possible to use oxides and hydroxides, the molybdic and tungstic acids and their salts, in particular the ammonium salts such as ammonium molybdate, ammonium heptamolybdate, ammonium tungstate, phosphomolybdic acid, phosphotungstic acid and their salts, silicomolybdic acid, silicotungstic acid and their salts. The ammonium oxides and salts such as ammonium molybdate, ammonium heptamolybdate and ammonium tungstate are preferably used.

The sources of elements of group VIII that can be used are well known to one skilled in the art. For example, for the non-noble metals, nitrates, sulfates, phosphates, halides, for example chlorides, bromides, and fluorides, and carboxylates, for example acetates and carbonates, will be used. For the noble metals, halides will be used, for example chlorides, nitrates, acids such as chloroplatinic acid, and oxychlorides such as ruthenium ammoniacal oxychloride.

The source of the preferred phosphorus is the $H_3PO_4$ orthophosphoric acid, but its salts and esters, such as the ammonium phosphates, are also suitable. Phosphorus can be introduced, for example, in the form of a mixture of phosphoric acid and a basic organic compound that contains nitrogen, such as ammonia, primary and secondary amines, cyclic amines, compounds of the pyridine family and quinolines and compounds of the pyrrole family.

Numerous silicon sources can be used. It thus is possible to use ethyl orthosilicate $Si(OEt)_4$, siloxanes, polysiloxanes, halide silicates such as ammonium fluorosilicate $(NH_4)_2SiF_6$ or sodium fluorosilicate $Na_2SiF_6$. The silicomolybdic acid and its salts, and the silicotungstic acid and its salts can also advantageously be used. Silicon can be added, for example, by impregnation of ethyl silicate in solution in a water/alcohol mixture. The silicon can be added, for example, by impregnation of a silicone-type silicon compound that is suspended in water.

The boron source can be boric acid, preferably orthoboric acid $H_3BO_3$, ammonium biborate or pentaborate, boron oxide, and boric esters. The boron can be introduced, for example, in the form of a mixture of boric acid, oxidized water and a basic organic compound that contains nitrogen, such as ammonia, primary and secondary amines, cyclic amines, compounds of the pyridine family and quinolines and compounds of the pyrrole family. Boron can be introduced by, for example, a boric acid solution in a water/alcohol mixture.

The sources of elements of group VIIA that can be used are well known to one skilled in the art. For example, the fluoride anions can be introduced in the form of hydrofluoric acid, or its salts. These salts are formed with alkaline metals, ammonium or an organic compound. In the latter case, the salt is advantageously formed in the reaction mixture by reaction between the organic compound and the hydrofluoric acid. It is also possible to use hydrolyzable compounds that can release fluoride anions in water, such as ammonium fluorosilicate $(NH_4)_2$ $SiF_6$, silicon tetrafluoride $SiF_4$ or sodium tetrafluoride $Na_2SiF_6$. Fluorine can be introduced by, for example, impregnation of an aqueous solution of hydrofluoric acid or ammonium fluoride.

The sources of elements of group VIIB that can be used are well known to one skilled in the art. Ammonium salts, nitrates and chlorides are preferably used.

The catalysts that are thus obtained, in oxide form, optionally can be brought at least in part into metallic or sulfide form.

The catalysts that are obtained by this invention are shaped in the form of grains of different shapes and sizes. They are generally used in the form of cyclical or multilobar extrudates, such as bilobar, trilobar, multilobar extrudates of straight or twisted shape, but they can optionally be produced and used in the form of crushed powder, tablets, rings, balls, and wheels. They have a specific surface area that is measured by nitrogen adsorption according to the BET method (Brunauer, Emmett, Teller, J. Am. Chem. Soc., Vol. 60, 308–316 (1938)) of between 50 and 600 $m^2/g$, a pore volume that is measured by mercury porosimetry of between 0.2 and 1.5 $cm^3/g$ and a pore size distribution that can be monomodal, bimodal or polymodal.

The catalysts that are thus obtained are used for the hydroconversion of hydrocarbon feedstocks (within the broad sense of conversion in the presence of hydrogen) and in particular for hydrocracking and hydrorefining. The hydroconversion catalyst then contains at least one hydrodehydrogenating element.

The catalysts that are obtained by this invention are used for hydrocracking hydrocarbon feedstocks such as the petroleum fractions. The feedstocks that are used in the process are gasolines, kerosenes, gas oils, vacuum gas oils, atmospheric residues, vacuum residues, atmospheric distillates, vacuum distillates, heavy fuels, oils, waxes and paraffins, used oils, residues or deasphalted crude oils, feedstocks that are obtained from thermal or catalytic conversion processes and their mixtures. They contain heteroatoms such as sulfur, oxygen, and nitrogen and optionally metals.

The catalysts that are thus obtained are used advantageously for hydrocracking in particular vacuum distillate-type heavy hydrocarbon fractions, deasphalted or hydrotreated residues or the equivalent. The heavy fractions preferably consist of at least 80% by volume of compounds whose boiling points are at least 350° C. and preferably between 350 and 580° C. (i.e., corresponding to compounds that contain at least 15 to 20 carbon atoms). They generally contain heteroatoms such as sulfur and nitrogen. The nitrogen content is usually between 1 and 5000 ppm by weight, and the sulfur content is between 0.01 and 5% by weight.

The hydrocracking conditions such as temperature, pressure, hydrogen recycling rate, hourly volumetric flow rate, can be very variable based on the nature of the feedstock, the quality of the desired products and the installations used by the refiner. The temperature is generally higher than 200° C. and often between 250° C. and 450° C. The pressure is greater than 0.1 MPa and often greater than 1 MPa. The hydrogen recycling rate is at least 50 and often between 80 and 5000 normal liters of hydrogen per liter of feedstock. The hourly volumetric flow rate is generally between 0.1 and 20 volumes of feedstock per volume of catalyst and per hour.

The catalysts of this invention are preferably subjected to a sulfurization treatment that makes it possible to transform, at least in part, the metallic radicals into sulfide before they are brought into contact with the feedstock that is to be treated. This activation treatment by sulfurization is well known to one skilled in the art and can be carried out by any method that is already described in the literature.

A standard sulfurization method that is well known to one skilled in the art consists in heating in the presence of hydrogen sulfide to a temperature of between 150 and 800° C., preferably between 250 and 600° C., generally in a flushed-bed reaction zone.

The catalyst of this invention advantageously can be used for hydrocracking vacuum distillate-type fractions that are high in sulfur and nitrogen. The desired products are middle distillates and/or oils. Advantageously, hydrocracking is used in combination with a preliminary hydrotreatment stage in a process for the improved production of middle distillates together with the production of oil bases that have a viscosity number of between 95 and 150.

In a first embodiment of partial hydrocracking that is also called soft hydrocracking, the conversion level is less than 55%. The catalyst according to the invention is then used at a temperature that is generally greater than or equal to 230° C. and preferably 300° C., generally at most 480° C. and often between 350° C. and 450° C. The pressure is generally greater than 2 MPa and preferably 3 MPa,; it is less than 12 MPa and preferably less than 10 MPa. The amount of hydrogen is at least 100 normal liters of hydrogen per liter of feedstock and often between 200 and 3000 normal liters of hydrogen per liter of feedstock. The hourly volumetric flow rate is generally between 0.1 and 10 $h^{-1}$. Under these conditions, the catalysts of this invention have better activity in conversion, hydrodesulfurization, and hydrodenitrating than the commercial catalysts.

In a second embodiment, the process is carried out in two stages, whereby the catalyst of this invention is used for partial hydrocracking, advantageously under moderate hydrogen pressure conditions, of, for example, vacuum distillate-type fractions that are high in sulfur and nitrogen and that have been previously hydrotreated. In this hydrocracking mode, the conversion level is less than 55%. In this case, the conversion process of the petroleum fraction takes place in two stages, whereby the catalysts according to the invention are used in the second stage. The catalyst of the first stage can be any hydrotreatment catalyst that is contained in the prior art. This hydrotreatment catalyst advantageously comprises a matrix preferably with an alumina base and at least one metal that has a hydrogenating function. The hydrotreatment function is ensured by at least one metal or metal compound, alone or in combination, selected from among the metals of group VIII and group VIB, such as selected from among nickel, cobalt, molybdenum and tungsten in particular. In addition, this catalyst optionally can contain phosphorus and optionally boron.

The first stage takes place generally at a temperature of 350–460° C., preferably 360–450° C., a total pressure of at least 2 MPa, and preferably 3 MPa, an hourly volumetric flow rate of 0.1–5 $h^{-1}$ and preferably 0.2–2 $h^{-1}$ and with an amount of hydrogen of at least 100 Nl/Nl of feedstock and preferably 260–3000 Nl/Nl of feedstock.

For the conversion stage with the catalyst according to the invention (or second stage), the temperatures are generally greater than or equal to 230° C. and often between 300° C. and 480° C., preferably between 330° C. and 450° C. The pressure is generally at least 2 MPa and preferably 3 MPa; it is less than 12 MPa and preferably less than 10 MPa. The amount of hydrogen is at least 100 l/l of feedstock and often between 200 and 3000 l/l of hydrogen per liter of feedstock. The hourly volumetric flow rate is generally between 0.15 and 10 $h^{-1}$. Under these conditions, the catalysts of this invention have a better activity in conversion, hydrodesulfurization, and hydrodenitrating and a better selectivity in middle distillates than the commercial catalysts. The service life of the catalysts is also improved in the moderate pressure range.

In another embodiment in two stages, the catalyst of this invention can be used for hydrocracking under high hydrogen pressure conditions of at least 5 MPa. The treated fractions are, for example, of vacuum distillate type and high in sulfur and nitrogen and have been previously hydrotreated. In this hydrocracking mode, the conversion level is higher than 55%. In this case, the petroleum fraction conversion process takes place in two stages, whereby the catalyst according to the invention is used in the second stage.

The catalyst of the first stage can be any hydrotreatment catalyst that is contained in the prior art. This hydrotreatment catalyst advantageously comprises a matrix preferably with an alumina base and at least one metal that has a hydrogenating function. The hydrotreatment function is ensured by at least one metal or metal compound, alone or in combination, selected from among the metals of group VIII and group VIB, such as selected from among nickel, cobalt, molybdenum and tungsten in particular. In addition, this catalyst optionally can contain phosphorus and optionally boron.

The first stage generally takes place at a temperature of 350–460° C., preferably 360–450° C., a pressure that is higher than 3 MPa, an hourly volumetric flow rate of 0.1–5 h$^{-1}$ and preferably 0.2–2 h$^{-1}$ and with an amount of hydrogen of at least 100 Nl/Nl of feedstock, and preferably 260–3000 Nl/Nl of feedstock.

For the conversion stage with the catalyst according to the invention (or second stage), the temperatures are in general greater than or equal to 230° C. and often between 300° C. and 480° C. and preferably between 300° C. and 440° C. The pressure is generally greater than 5 MPa and preferably greater than 7 MPa. The amount of hydrogen is at least 100 l/l of feedstock and often between 200 and 3000 l/l of hydrogen per liter of feedstock. The hourly volumetric flow rate is in general between 0.15 and 10 h$^{-1}$.

Under these conditions, the catalysts of this invention have a better conversion activity and a better selectivity of middle distillates than the commercial catalysts, even for considerably lower zeolite contents than those of the commercial catalysts.

In a process for the production of oils that advantageously uses the hydrocracking process according to the invention, the operation is carried out according to the teaching of U.S. Pat. No. 5,525,209 with a first hydrotreatment stage under conditions that make it possible to attain an effluent that has a viscosity number of 90–130 and a reduced content of nitrogen and polyaromatic compounds. In the following hydrocracking stage, the effluent is treated according to the invention so as to adjust the value of the viscosity number to the one that is desired by the user.

The catalysts that are obtained by this invention are also used for hydrorefining hydrocarbon feedstocks such as the petroleum fractions, the fractions that are obtained from carbon or hydrocarbons that are produced from natural gas. The main reactions that are employed are the hydrogenation of aromatic compounds, hydrodenitrating, hydrodeoxygenation, hydrodesulfurization, hydrodemetallization, accompanied most often by hydrocracking. The hydrocarbon feedstocks contain aromatic compounds and/or olefinic compounds and/or napthenic compounds and/or paraffinic compounds and optionally metals and/or nitrogen and/or oxygen and/or sulfur. In these uses, the catalysts that are obtained by this invention have an improved activity relative to the prior art.

The feedstocks that are used in the process are gasolines, gas oils, vacuum gas oils, atmospheric residues, vacuum residues, atmospheric distillates, vacuum distillates, heavy fuels, oils, waxes, and paraffins, used oils, deasphalted residues or crude oils, feedstocks that are obtained from thermal or catalytic conversion processes and their mixtures. They contain heteroatoms such as sulfur, oxygen and nitrogen and at least one metal. The heavy fractions, as such and by way of non-exhaustive examples, the vacuum distillates, deasphalted or hydrotreated residues or the equivalent, preferably consist of at least 80% by volume of compounds whose boiling points are at least 350° C. and preferably between 350 and 580° C. (i.e., corresponding to compounds that contain at least 15 to 20 carbon atoms). They generally contain heteroatoms such as sulfur and nitrogen. The nitrogen content is usually between 1 and 5000 ppm by weight, and the sulfur content is between 0.01 and 5% by weight.

The catalysts of this invention are also advantageously used preferably during the pretreatment of catalytic cracking feedstocks and in the first stage of a soft hydrocracking or hydroconversion. They are then usually used in combination with an acid catalyst, zeolitic or not zeolitic for the second treatment stage.

The hydrorefining conditions, such as temperature, pressure, hydrogen recycling rate, hourly volumetric flow rate, can be very variable based on the nature of the feedstock, the quality of the desired products and installation used by the refiner. The temperature is in general higher than 200° C. and often between 250° C. and 480° C. The pressure is higher than 0.05 MPa and often higher than 1 MPa. The hydrogen recycling rate is at least 80 and often between 50 and 5000 normal liters of hydrogen per liter of feedstock. The hourly volumetric flow rate is in general between 0.1 and 20 volumes of feedstock per volume of catalyst and per hour.

The catalysts of this invention are preferably subjected to a sulfurization treatment that makes it possible to transform, at least in part, the metallic radicals into sulfide before they are brought into contact with the feedstock to be treated. This activation treatment by sulfurization is well known to one skilled in the art and can be carried out by any method that is already described in the literature.

A standard sulfurization method that is well known to one skilled in the art consists in heating the mixture of solids under a stream of a mixture of hydrogen and hydrogen sulfide or under a stream of a mixture of nitrogen and hydrogen sulfide at a temperature of between 150 and 800° C., preferably between 250 and 600° C., generally in a flushed-bed reaction zone.

The results that are important to the refiner are the HDS activity, the HDN activity and the conversion activity. The desired goals should be achieved under conditions that are compatible with the economic reality. Thus, the refiner seeks to decrease the temperature, the pressure, and the hydrogen recycling rate and to maximize the hourly volumetric flow rate. It is known that the activity can be increased by a temperature increase, but it is often to the detriment of the stability of the catalyst. The stability or service life improves with an increase of the pressure or the hydrogen recycling rate, but this is done to the detriment of the economy of the process.

The following examples illustrate this invention without, however, limiting its scope.

EXAMPLE 1

Preparation of a Hydrocracking or Hydrorefining Catalyst Substrate that Contains a Partially Amorphous Y Zeolite A USY commercial ultrastable dealuminified zeolite with an overall Si/Al molar ratio that is equal to 15.2, Si/Al framework ratio 29, a crystalline parameter that is equal to 24.29 Å that contains 0.03% by weight of Na, that has a peak rate of 0.48 and that has a crystalline fraction of 85%, is amorphized by a hydrothermic treatment at 620° C. for 5 hours in the presence of a partial pressure of water vapor equal to 0.5 bar absolute. The zeolite is then subjected to an acid attack that is carried out under the following conditions: normality of the acid 0.85N, duration of 3 hours and temperature equal to 95° C. A last hydrothermic treatment that is identical to the first with a partial pressure of water vapor that is equal to 0.02 bar is applied to the zeolite. At the end of these treatments, the partially amorphous zeolite has a peak rate of 0.26, a crystalline fraction of 44%, an overall Si/Al ratio of 72, and an Si/Al$^{iv}$ framework ratio of 80, a pore volume of 0.35 ml of liquid nitrogen per gram of which 29% consists of pores whose diameters are at least equal to 5 nanometers (50 Å). A hydrocracking catalyst substrate that contains this Y zeolite is produced in the following way:

60 g of the partially amorphous Y zeolite that is described above is mixed with 40 g of a matrix that consists of ultrafine tabular boehmite or alumina gel that is marketed under the name SB3 by the Condéa Chemie GmbH Company. This powder mixture was then mixed with an aqueous solution that contains nitric acid at 66% (7% by weight of acid per gram of dry gel) then mixed for 15 minutes. At the end of this mixing, the paste that is obtained is passed through a die that has cylindrical orifices with a diameter that is equal to 1.4 mm. The extrudates are then dried for one night at 120° C. under air and then calcined at 550° C. under air.

EXAMPLE 2

Preparation of Hydrocracking and Hydrorefining Catalysts that Contain a Partially Amorphous Y Zeolite, According to the Invention The substrate extrudates that contain a partially amorphous Y zeolite of Example 1 are impregnated in the dry state by an aqueous solution of ammonium heptamolybdate, dried for one night at 120° C. under air and finally calcined under air at 550° C. The contents by weight of the oxides of the $Y_1Mo$ catalyst that are obtained are indicated in Table 1.

The $Y_1Mo$ catalyst was then impregnated by an aqueous solution that contains ammonium biborate for obtaining a deposit of about 1.7% by mass of $B_2O_3$. After maturation at ambient temperature in a water-saturated atmosphere, the impregnated extrudates are dried for one night at 120° C. and then calcined at 550° C. for 2 hours under dry air. A catalyst that is named $Y_1MoB$ is obtained. In the same way, a $Y_1MoSi$ catalyst was then prepared by impregnation of the $Y_1Mo$ catalyst by a Rhodorsil EP1 silicone emulsion (Rhone-Poulenc) to deposit about 2.0% of $SiO_2$. The impregnated extrudates are then dried for one night at 120° C. and then calcined at 550° C. for 2 hours under dry air. Finally, a $Y_1MoBSi$ catalyst achieved impregnation of the Y1Mo catalyst by an aqueous solution that contains ammonium biborate and the Rhodorsil EP1 (Rhone-Poulenc) silicone emulsion. The impregnated extrudates are then dried for one night at 120° C. and then calcined at 550° C. for 2 hours under dry air.

The substrate extrudates that contain a partially amorphous Y zeolite, prepared in Example 1, are impregnated in the dry state by an aqueous solution of a mixture of ammonium heptamolybdate and nickel nitrate, dried for one night at 120° C. under air and finally calcined under air at 550° C. The contents by weight of the $Y_1NiMo$ catalyst oxides that are obtained are indicated in Table 3.

The extrudates are impregnated in the dry state by an aqueous solution of an ammonium heptamolybdate mixture, nickel nitrate and orthophosphoric acid, dried for one night at 120° C. under air and finally calcined under air at 550° C. The contents by weight of $Y_1NiMoP$ catalyst oxides that are obtained are indicated in Table 3.

We then impregnated the sample of the $Y_1NiMoP$ catalyst by an aqueous solution that contains ammonium biborate. After maturation at ambient temperature in a water-saturated atmosphere, the impregnated extrudates are dried for one night at 120° C. and then calcined at 550° C. for 2 hours under dry air. A catalyst that is named $Y_1NiMoPB$ is obtained.

A $Y_1NiMoPSi$ catalyst was obtained by the same procedure as the $Y_1NiMoPB$ catalyst above but by replacing in the impregnation solution the boron precursor by the Rhodorsil EP1 silicone emulsion.

Finally, a $Y_1NiMoPBSi$ catalyst was obtained by the same procedure as the catalysts above but by using an aqueous solution that contains the ammonium biborate and the Rhodorsil EP1 silicone emulsion. Fluorine is then added to this catalyst by impregnation of a dilute hydrofluoric acid solution to deposit about 1% by weight of fluorine. After drying for one night at 120° C. and calcination at 550° C. for 2 hours under dry air, the $Y_1NiMoPBSiF$ catalyst is obtained. The final contents of oxides of the $Y_1NiMo$ catalysts are indicated in Table 1.

TABLE 1

Characteristics of the $Y_1Mo$ and $Y_1NiMo$ Catalysts

| Catalyst | $Y_1Mo$ | $Y_1MoB$ | $Y_1MoSi$ | $Y_1MoBSi$ |
|---|---|---|---|---|
| $MoO_3$ (% by weight) | 14.3 | 14.5 | 14.2 | 14.1 |
| $B_2O_3$ (% by weight) | 0 | 1.5 | 0 | 1.6 |
| $SiO_2$ (% by weight) | 50.7 | 49.7 | 52.3 | 51.4 |
| Addition to 100% consisting of for the most part $Al_2O_3$ (% by weight) | 35.0 | 34.3 | 33.5 | 32.9 |

| | $Y_1$ NiMo | $Y_1$ NiMoP | $Y_1$ NiMo PB | $Y_1$ NiMo PSi | $Y_1$ NiMo PBSi | $Y_1$ NiMoPB-SiF |
|---|---|---|---|---|---|---|
| $MoO_3$ (% by weight) | 13.5 | 13.9 | 12.8 | 12.9 | 12.9 | 12.85 |
| NiO (% by weight) | 3.05 | 2.2 | 2.95 | 2.9 | 3.0 | 2.95 |
| $P_2O_5$ (% by weight) | 0 | 4.4 | 4.3 | 4.5 | 4.5 | 4.4 |
| $B_2O_3$ (% by weight) | 0 | 0 | 1.4 | 0 | 1.5 | 1.6 |
| $SiO_2$ (% by weight) | 49.4 | 47.0 | 46.5 | 48.6 | 47.9 | 47.3 |
| F (% by weight) | 0 | 0 | 0 | 0 | 0 | 1.0 |
| Addition to 100% that consists of for the most part $Al_2O_3$ (% by weight) | 34.05 | 32.5 | 32.05 | 31.1 | 30.2 | 29.9 |

The $Y_1NiMoP$ catalyst was then impregnated by an aqueous solution that contains manganese nitrate. After maturation at ambient temperature in a water-saturated atmosphere, the impregnated extrudates are dried for one night at 120° C. and then calcined at 550° C. for 2 hours under dry air. A catalyst named $Y_1NiMoPMn$ is obtained. This catalyst is then impregnated by an aqueous solution that contain ammonium biborate and the Rhodorsil EP1 (Rhone-Poulenc) silicone emulsion. The impregnated extrudates are then dried for one night at 120° C. and then calcined at 550° C. for 2 hours under dry air, and the $Y_1NiMoPMnBSi$ catalyst is obtained. A dilute hydrofluoric acid solution is then added to this catalyst of fluorine by impregnation to deposit about 1% by weight of fluorine. After drying for one night at 120° C. and calcination at 550° C. for 2 hours under dry air, the $Y_1NiMoPMnBSiF$ catalyst is obtained. The contents by weight of these catalysts are indicated in Table 2.

TABLE 2

Characteristics of the $Y_1$NiMo Catalysts that Contain Manganese

| Catalyst | $Y_1$ NiMoPMn | $Y_1$ NiMoPMnBSi | $Y_1$ NiMoPMnBSiF |
|---|---|---|---|
| $MoO_3$ (% by weight) | 12.6 | 12.1 | 12.2 |
| NiO (% by weight) | 3.1 | 2.9 | 2.8 |
| $MnO_2$ (% by weight) | 2.1 | 2.1 | 2.2 |
| $P_2O_3$ (% by weight) | 4.4 | 4.5 | 4.9 |
| $B_2O_3$ (% by weight) | 0 | 1.2 | 1.4 |
| $SiO_2$ (% by weight) | 46.0 | 47.1 | 46.4 |
| F (% by weight) | 0 | 0 | 1.0 |
| Addition to 100% that consists of for the most part $Al_2O_3$ (% by weight) | 31.8 | 30.1 | 29.1 |

The analysis, by electronic microprobe, of the $Y_1$NiMoPSi, $Y_1$NiMoPBSi and $Y_1$NiMoPBSiF catalysts (Table 3) and the $Y_1$NiMoPMnBSi and $Y_1$NiMoPMnBSiF catalysts (Table 3b) shows that the silicon that is added to the catalyst according to the invention is mainly located on the matrix and is in amorphous silica form.

EXAMPLE 3

Preparation of a Substrate that Contains a $Y_1$ Zeolite and a Silica-Alumina

We produced a silica-alumina powder by co-precipitation that has a composition of 2% $SiO_2$ and 98% $Al_2O_3$. A hydrocracking catalyst substrate that contains this silica-alumina and the partially amorphous Y zeolite of Example 1 was then produced. For this purpose, 50% by weight of the partially amorphous Y zeolite of Example 1 that is mixed with 50% by weight of a matrix that consists of the silica alumina that is prepared above is used. This powder mixture was then mixed with an aqueous solution that contains nitric acid at 66% (7% by weight of acid per gram of dry gel) and then mixed for 15 minutes. At the end of this mixing, the paste that is obtained is passed through a die that has cylindrical orifices with a diameter that is equal to 1.4 mm. The extrudates are then dried for one night at 120° C. and then calcined at 550° C. for 2 hours under air.

EXAMPLE 4

Preparation of Hydrocracking Catalysts that Contain a Partially Amorphous Y Zeolite and a Silica-Alumina The substrate extrudates that contain a silica-alumina and a partially amorphous Y zeolite of Example 3 are impregnated in the dry state by an aqueous solution of a mixture of ammonium heptamolybdate, nickel nitrate and orthophosphoric acid, dried for one night at 120° C. under air and finally calcined under air at 550° C. The contents by weight of oxides of the $Y_1$—SiAl—NiMoP catalyst that are obtained are indicated in Table 4.

We impregnated the sample of $Y_1$—SiAl—NiMoP catalyst by an aqueous solution that contains ammonium bibo-rate to impregnate 1.5% by mass of $B_2O_3$. After maturation at ambient temperature in a water-saturated atmosphere, the impregnated extrudates are dried for one night at 120° C. and then calcined at 550° C. for 2 hours under dry air. A catalyst that is named $Y_1$—SiAl—NiMoPB that therefore contains silicon in the silica-alumina matrix is obtained.

The characteristics of the $Y_1$—SiAl—NiMo catalysts are summarized in Table 3:

TABLE 3

Characteristics of the $Y_1$-SiAl-NiMo Catalysts

| Catalyst | $Y_1$-SiAl-NiMoP | $Y_1$-SiAl-NiMoPB |
|---|---|---|
| $MoO_3$ (% by weight) | 13.1 | 13.5 |
| NiO (% by weight) | 2.9 | 2.7 |
| $P_2C_5$ (% by weight) | 4.7 | 4.9 |
| $B_2O_3$ (% by weight) | 0 | 1.4 |
| $SiO_2$ (% by weight) | 47.6 | 46.5 |
| Addition to 100% that consists of for the most part $Al_2O_3$ (% by weight) | 31.7 | 31.0 |

EXAMPLE 5

Preparation of a Substrate that Contains a Zeolite of the Prior Art

A hydrocracking catalyst substrate that contains a Y zeolite was produced in a large amount to be able to prepare various catalysts that are based on the same substrate. For this purpose, 20.5% by weight of the same USY commercial zeolite is used as the one that is used in Example 1. This zeolite is mixed with 79.5% by weight of a matrix that consists of ultrafine tabular boehmite or alumina gel that is marketed under the name SB3 by the Condéa Chemie GmbH Company. This powder mixture was then mixed with an aqueous solution that contains nitric acid at 66% (7% by weight of acid per gram of dry gel) then mixed for 15 minutes. At the end of this mixing, the paste that is obtained is passed through a die that has cylindrical orifices with a diameter that is equal to 1.4 mm. The extrudates are then dried for one night at 120° C. and then calcined at 550° C. for 2 hours under air. Cylindrical extrudates of 1.2 mm of diameter that have a specific surface area of 223 $m^2$/g and a monomodal pore size distribution that is centered at 10 nm are thus obtained.

EXAMPLE 6

Preparation of Hydrocracking Catalysts that Contain the Y Zeolite of Example 5

The substrate extrudates that contain dealuminified Y zeolite of Example 5 are impregnated in the dry state by an aqueous solution of a mixture of ammonium heptamolybdate, nickel nitrate and orthophosphoric acid, dried for one night at 120° C. under air and finally calcined under air at 550° C. The contents by weight of oxides of the YNiMoP catalyst that are obtained are indicated in Table 5. The final YNiMoP catalyst contains in particular 16.3% by weight of Y zeolite with a mesh parameter of 2.429 nm of overall $SiO_2/Al_2O_3$ ratio of 30.4 and $SiO_2/Al_2O_3$ framework ratio of 58.

We impregnated the sample of the YNiMoP catalyst by an aqueous solution that contains ammonium biborate. After maturation at ambient temperature in a water-saturated atmosphere, the impregnated extrudates are dried for one night at 120° C. and then calcined at 550° C. for 2 hours under dry air. An NiMoP/alumina-Y catalyst that is doped with boron is obtained.

A YNiMoPSi catalyst was obtained by the same procedure as the YNiMoPB catalyst above but by replacing in the impregnation solution the boron precursor by the Rhodorsil EP1 (Rhone-Poulenc) silicone emulsion.

Finally, a YNiMoPBSi catalyst achieved impregnation of the catalyst by an aqueous solution that contains ammonium biborate and Rhodorsil EP1 (Rhone-Poulenc) silcone emulsion. The other stages of the procedure are the same as those that are indicated above. The characteristics of the YNiMo catalysts are summarized in Table 4.

TABLE 4

Characteristics of the YNiMo Catalysts (Not in Accordance with the Invention)

| Catalyst | YNiMo | YNiMoP | YNi-MoPB | YNi-MoPBSi | YNi-MoPSi |
|---|---|---|---|---|---|
| $MoO_3$ (% by weight) | 13.5 | 12.9 | 12.7 | 12.7 | 12.5 |
| NiO (% by weight) | 3.1 | 3.0 | 2.9 | 2.9 | 2.8 |
| $P_2O_6$ (% by weight) | 0 | 4.4 | 4.3 | 4.3 | 4.2 |
| $B_2O_3$ (% by weight) | 0 | 0 | 1.8 | 0 | 1.8 |
| $SiO_2$ (% by weight) | 16.2 | 15.4 | 15.2 | 17.0 | 16.7 |
| Addition to 100% that consists of for the most part $Al_2O_3$ (% by weight) | 67.2 | 64.3 | 63.1 | 63.1 | 62.0 |

The analysis, by electronic microprobe, of the YNiMoPSi and YNiMoPBSi catalysts (Table 5) shows that the silicon that is added to the catalyst according to the invention is mainly located on the matrix and is in amorphous silica form.

EXAMPLE 7

Comparison of the Catalysts for Hydrocracking a Vacuum Gas Oil with Partial Conversion The catalysts whose preparations are described in the examples above are used under moderate pressure hydrocracking conditions on a petroleum feedstock whose main characteristics are as follows:

| Density (20/4) | 0.921 |
|---|---|
| Sulfur (% by weight) | 2.40 |
| Nitrogen (ppm by weight) | 1130 |
| Simulated distillation | |
| Starting point | 365° C. |
| 10% point | 430° C. |
| 50% point | 472° C. |
| 90% point | 504° C. |
| Final point | 539° C. |
| Pour point | +39° C. |

The catalytic test unit comprises two fixed-bed reactors with upward circulation of the feedstock ("up-flow"). In the first reactor, the one in which the feedstock passes first, the catalyst of HTH548 hydrotreatment stage that is sold by the Procatalyse Company and that comprises an element of group VI and an element of group VIII that are deposited on alumina is introduced. In the second reactor, the one in which the feedstock passes last, a hydrocracking catalyst that is described above is introduced.

In each of the reactors, 40 ml of catalyst is introduced. The two reactors operate at the same temperature and at the same pressure. The operating conditions of the test unit are as follows:

| Total pressure | 5 MPa |
|---|---|
| Hydrotreatment catalyst | 40 cm³ |
| Hydrocracking catalyst | 40 cm³ |
| Temperature | 400° C. |
| Hydrogen flow rate | 20 l/h |
| Feedstock flow rate | 40 cm³/h |

The two catalysts undergo an in-situ sulfurization stage before reaction. We note that any in-situ or ex-situ sulfurization method is suitable. Once the sulfurization is carried out, the feedstock that is described above can be transformed.

The catalytic performances are expressed in terms of hydrodesulfurization conversions (HDS) and hydrodenitrating conversions (HDN). These catalytic performances are measured in the catalyst after a stabilization period, generally at least 48 hours, has elapsed.

Hydrodesulfurization conversion HDS is assumed to be equal to:

$$HDS=(S_{initial}-S_{effluent})/S_{initial}*100=(24600-S_{effluent})/24600*100$$

Hydrodenitrating conversion HDN is assumed to be equal to:

$$HDN=(N_{initial}*N_{effluent})/N_{initial}*100=(1130-N_{effluent})/1130*100$$

In the following table, we recorded hydrodesulfurization conversion HDS and hydrodenitrating conversion HDN for the catalysts.

TABLE 5

Catalytic Activities of the Catalysts in Partial Hydrocracking at 400° C.

| References | Composition | HDS (%) | HDN (%) |
|---|---|---|---|
| YNiMoP | NiMoP/Y - $Al_2O_3$ | 99.43 | 96.6 |
| YNiMoPB | NiMoPB/Y | 99.57 | 97.4 |
| YNiMoPSi | NiMoPSi/Y | 99.85 | 98.3 |
| $Y_1$-SiAl-NiMoP | NiMoP/$Y_1$-SiAl | 98.6 | 96.6 |
| $Y_1$-SiAl-NiMoPB | NiMoPB/$Y_1$-SiAl | 98.7 | 97.8 |
| $Y_1$NiMo | NiMo/$Y_1$-$Al_2O_3$ | 98.6 | 95.1 |
| $Y_1$NiMoP | NiMoP/$Y_1$ | 99.3 | 97.0 |
| $Y_1$NiMoPB | NiMoPB/$Y_1$ | 99.7 | 97.8 |
| $Y_1$NiMoPSi | NiMoPSi/$Y_1$ | 99.8 | 98.7 |
| $Y_1$NiMoPBSi | NiMoPBSi/$Y_1$ | 99.8 | 99.0 |

The results of Table 6 show that the use of a catalyst according to the invention, containing a partially amorphous Y zeolite, is more active in hydrodesulfurization and in hydrodenitrating than the catalysts of the prior art, and in contrast, the addition of at least one element that is selected from the group that is formed by B, Si and P provides an improvement of the performance levels of the catalyst according to the invention.

In addition, the results of Table 6 show that it is advantageous to introduce silicon into the catalyst that is already prepared ($Y_1$NiMo series) rather than in the form of a substrate that contains the silicon that is obtained from a silica-alumina ($Y_1$—SiAl—NiMo series). It is therefore particularly advantageous to introduce the silicon in a precursor that already contains the elements of group VIB and/or VIII and optionally at least one of elements P, B and F.

EXAMPLE 8

Comparison of the Catalysts in Hydrocracking of a High-conversion Vacuum Gas Oil The catalysts whose preparations are described in the preceding examples are used under high-conversion hydrocracking conditions (60–100%). The petroleum batch is a hydrotreated vacuum distillate whose main characteristics are as follows:

| | |
|---|---|
| Density (20/4) | 0.869 |
| Sulfur (ppm by weight) | 502 |
| Nitrogen (ppm by weight) | 10 |
| Simulated distillation | |
| Starting point | 298° C. |
| 10% point | 369° C. |
| 50% point | 427° C. |
| 90% point | 481° C. |
| Final point | 538° C. |

This feedstock was obtained by hydrotreatment of a vacuum distillate on an HR360 catalyst that is sold by the Procatalyse Company and that comprises an element of group VIB and an element of group VIII that are deposited on alumina.

An $H_2S$ precursor sulfur-containing compound and an $NH_3$ precursor nitrogen-containing compound are added to the hydrotreated feedstock to simulate the partial pressures of $H_2S$ and $NH_3$ that are present in the second hydrocracking stage. The feedstock that is thus prepared is injected into the hydrocracking test unit that comprises a fixed-bed reactor with upward circulation of the feedstock ("up-flow") into which is introduced 80 ml of catalyst. Before the feedstock is injected, the catalyst is sulfurized by an n-hexane/DMDS +aniline mixture up to 320° C. We note that any in-situ or ex-situ sulfurization method is suitable. Once the sulfurization is carried out, the feedstock that is described above can be transformed. The operating conditions of the test unit are as follows:

| | |
|---|---|
| Total pressure | 9 MPa |
| Catalyst | 80 cm³ |
| Temperature | 360–420° C. |
| Hydrogen flow rate | 80 l/h |
| Feedstock flow rate | 80 cm³/h |

The catalytic performances are expressed by the temperature that makes it possible to reach a gross conversion level of 70% and by the coarse selectivity of middle distillates 150–380° C. These catalytic performances are measured in the catalyst after a stabilization period, generally at least 48 hours, has elapsed.

Gross conversion CB is assumed to be equal to:

$CB$=% by weight of 380° C.$^{less}$ of the effluent

Coarse selectivity SB of middle distillate is assumed to be equal to:

$SB$=100*weight of the fraction (150° C.–380° C.)/weight of the fraction 380° C.$^{less}$ of the effluent The middle distillates that are obtained consist of products that have a boiling point of between 150 and 380° C.

The reaction temperature is set to reach a gross conversion CB that is equal to 70% by weight. In Table 6 below, we recorded the reaction temperature and the coarse selectivity for the catalysts that are described in Tables 3 and 3b, as well as the values of the viscosity numbers that are determined in the 380° C.+ fractions after removal of paraffin in the solvent.

Table 6 shows that the use of a catalyst according to the invention that contains the partially amorphous Y zeolite leads to coarse selectivities of middle distillate that are higher than those of anomalous catalysts of the prior art. In contrast, the addition of at least one element that is selected from the group that is formed by P, B and Si to the catalysts according to the invention also leads to an increase of activity. The improvement provided by the presence of manganese or fluorine to the activity is also noted.

In addition, it clearly appears that the viscosity numbers of fractions 380° C.+ that are obtained with the catalysts according to the invention are clearly improved.

Generally, the addition to the catalyst according to the invention of at least one element that is selected from the group P, B, Si, VIIB, VIIA to the catalyst that contains the partially amorphous Y zeolite and the element of group VIB makes it possible to improve the conversion activity, which is reflected by a reduction of the reaction temperature that is necessary to reach 70% conversion.

TABLE 6

Catalytic Activities of Catalysts In High-Conversion Hydrocracking (70%)

| Reference | Composition | T (° C.) | Coarse Selectivity of Middle Distillate (150–360° C.) (% by weight) | Viscosity Number VI 380° C. + Removal of Paraffin |
|---|---|---|---|---|
| YNiMo | NiMo/Y-$Al_2O_3$ | 375 | 65.8 | 112 |
| YNiMo P | NiMoP/Y-$Al_2O_3$ | 374 | 66.4 | 115 |
| YNiMo PB | NiMoPB/Y-$Al_2O_3$ | 374 | 67.1 | 116 |
| YNiMo PSi | NiMoPSi/Y-$Al_2O_3$ | 374 | 68.0 | |
| $Y_1$MoB | MoB/$Y_1$-$Al_2O_3$ | 386 | 69.4 | |
| $Y_1$MoSi | MoSi/$Y_1$-$Al_2O_3$ | 386 | 69.6 | |
| $Y_1$MoBSi | MoBSi/$Y_1$-$Al_2O_3$ | 384 | 70.1 | |
| $Y_1$NiMo | NiMo/$Y_1$-$Al_2O_3$ | 387 | 70.3 | 123 |
| $Y_1$NiMoP | NiMoP/$Y_1$-$Al_2O_3$ | 384 | 71.1 | 124 |
| $Y_1$NiMoPB | NiMoPB/$Y_1$-$Al_2O_3$ | 384 | 71.8 | 120 |
| $Y_1$NiMoPSi | NiMoPSi/$Y_1$-$Al_2O_3$ | 382 | 72.5 | |
| $Y_1$NiMoPBSi | NiMoPBSi/$Y_1$-$Al_2O_3$ | 380 | 72.6 | |
| $Y_1$NiMoPBSiF | NiMoPBSiF/$Y_1$-$Al_2O_3$ | 376 | 72.3 | |
| $Y_1$NiMoPMn | NiMoPMn/$Y_1$-$Al_2O_3$ | 382 | 72.0 | |
| $Y_1$NiMoPMn BSi | NiMoPMnBSi/$Y_1$-$Al_2O_3$ | 380 | 71.9 | |
| $Y_1$NiMoPMn BSiF | NiMoPMnBSiF/$Y_1$-$Al_2O_3$ | 377 | 71.7 | |

EXAMPLE 9

Hydrotreatment Test of a Vacuum Distillate

The $Y_1$NiMo, $Y_1$NiMoP, $Y_1$NiMoPB, $Y_1$NiMoPBSi and $Y_1$NiMoPBSiF catalysts, whose preparations were described above, were compared in a hydrotreatment test of a vacuum distillate whose main characteristics are provided in the following table:

| Density at 15° C. | 0.938 |
|---|---|
| Sulfur | 3.12% by weight |
| Total nitrogen | 1050 ppm by weight |
| Simulated distillation | |
| Pi | 345° C. |
| 10% | 412° C. |
| 50% | 488° C. |
| 90% | 564° C. |
| PF | 615° C. |

The test is conducted in an isothermal pilot reactor with a flushed fixed bed, whereby the fluids circulate upward. After in-situ sulfurization at 350° C. in the pressurized unit with a direct distillation gas oil to which is added 2% by weight of dimethyl disulfide, the hydrotreatment test was conducted under the following operating conditions:

| Total pressure | 12 Mpa |
|---|---|
| Catalyst volume | 40 cm³ |
| Temperature | 380° C. |
| Hydrogen flow rate | 24 l/h |
| Feedstock flow rate | 20 cm³/h |

The catalytic performance levels of the tested catalysts are provided in Table 7 below. They are expressed in relative activity, by assuming that that of the $Y_1NiMo$ catalyst is equal to 1 and by considering that they are on the order of 1.5. The equation that links the activity and the hydrodesulfurization conversion (% HDS) is as follows:

$$A_{HDS} = \left[\frac{100}{(100 - \% \ HDS)}\right] 0.5_{-1}$$

The same equation is applicable for hydrodenitrating (%HDN and $A_{HDN}$).

The net conversion of the fraction of the feedstock that has a boiling point that is higher than 380° C. (% 380° C.⁺ by weight) that is obtained with each catalyst is also evaluated. It is expressed starting from simulated distillation results (ASTM D86 method) by the equation:

$$\text{Conv } 380° \ C.' = \frac{(\% \ 380° \ C.--) \ \text{formula} - (\% \ 380° \ C.-) \ \text{feedstock}}{(\% \ 380° \ C.+) \ \text{feedstock}}$$

TABLE 7

Activity of Catalysts in Vacuum Distillate Hydrotreatment

| Catalyst | $A_{HDS}$ relative to $Y_1NiMo$ | $A_{HDN}$ relative to $Y_1NiMo$ | Net Conv. 380° C. (% by weight) |
|---|---|---|---|
| $Y_1NiMo$ | 1 | 1 | 53.4 |
| $Y_1NiMoP$ | 1.07 | 1.2 | 55.2 |
| $Y_1NiMoPB$ | 1.15 | 1.4 | 57.8 |
| $Y_1NiMoPBSi$ | 1.3 | 1.7 | 59.5 |
| $Y_1NiMoPBSiF$ | 1.25 | 1.65 | 62.8 |

These examples show every advantage in using a catalyst according to the invention that makes it possible to attain activities in hydrodesulfurization and hydrodenitrating as well as a net conversion of products of 380° C. (products that have a boiling point that is less than 380° C.) higher than the catalysts that are known from the prior art.

The catalyst according to the invention therefore has an important activity of hydrogenating of the aromatic hydrocarbons and hydrodenitrating and hydrodesulfurization. Without wanting to be tied by any theory, it seems that this particularly high activity of the catalysts of this invention is due to the presence of the amorphized zeolite. It is reinforced by the joint presence of boron and silicon on the matrix which induces, on the one hand, an improvement of the hydrogenating, hydrodesulfurizing and hydrodenitrating properties, and, on the other hand, an improvement of conversion.

What is claimed is:

1. A catalyst comprising: (1) at least one matrix and at least one partially amorphous Y zeolite that has a peak rate that is less than 0.4, a crystalline fraction, expressed relative to a reference zeolite in sodium form (Na), that is less than 60%, (2) at least one hydro-dehydrogenating element that is selected from the group consisting of the elements of group VII and the elements of group VIB, and (3) at least one promoter element that is selected from the group consisting of phosphorus, boron, and silicon,
   wherein the zeolite has the following characteristics:
   an overall Si/Al ratio that is greater than 15,
   an $Si/Al^{iv}$ framework ratio that is greater than or equal to the overall Si/Al ratio,
   a pore volume that is at least equal to 0.20 ml/g wherein between 8% and 50% of the pore volume consists of pores that have a diameter of at least 5 nm, and
   a specific surface area of 210–800 m²/g.

2. Catalyst according to claim 1, in which the promoter element is deposited on the catalyst and mainly located on the matrix.

3. Catalyst according to claim 1 that also contains at least one element of group VII A.

4. Catalyst according to claim 1 that also contains at least one element of group VII B.

5. Catalyst according to claim 4 in which the element of group VII B is manganese.

6. Catalyst according to claim 1 that contains in % by weight relative to the total mass of the catalyst:
   0.1 to 99.9% of at least one oxide-type amorphous or poorly crystallized porous mineral matrix,
   0.1 to 99.9% of partially amorphous Y zeolite,
   0.1 to 60% of at least one hydro-dehydrogenating element,
   0.1 to 20% of at least one element that is selected from the group that is formed by boron, silicon and phosphorus,
   0 to 20% of at least one element of group VII A,
   0 to 20% of at least one element of group VII B.

7. Catalyst according to claim 1, in which the matrix is selected from the group consisting of alumina, silica-alumina, aluminates, and silica.

8. Catalyst according to claim 1, in which the partially amorphous Y zeolite is obtained by using dealuminification techniques on a Y zeolite that is available commercially.

9. Catalyst according to claim 8, in which the techniques that are used in combination are hydrothermal treatment, ion exchange, and acid attack.

10. A process for hydroconversion of a hydrocarbon feedstock comprising contacting the feedstock with the catalyst of claim 1.

11. Process according to claim 10 comprising hydrocracking the feedstock with the catalyst.

12. Process according to claim 11 wherein the hydrocracking is conducted at a temperature higher than 200° C., a pressure higher than 0.1 MPa, a volumetric flow rate of 0.1–20 h$^{-1}$ and a hydrogen recycling of at least 50 Nl/l of feedstock.

13. Process according to claim 11, in which the pressure is higher than 2 MPa and less than 12 MPa, the temperature is at least 230° C., the volumetric flow rate is 0.1–10 h$^{-1}$ and the hydrogen recycling is at least 100 Nl/l of feedstock, wherein the conversion is less than 55%.

14. Process according to claim 11, in which the pressure is at least 5 MPa, and the conversion is greater than 55%.

15. Process according to claim 11 in which the catalyst is previously sulfurized.

16. Process according to 11, in which the feedstock is subjected to a hydrotreatment before being hydrocracked.

17. Process according to claim 10, comprising hydrorefining the feedstock with the catalyst.

18. Process according to claim 17, wherein the hydrorefining is conducted at a temperature higher than 200° C., a pressure higher than 0.05 MPa, a hydrogen recycling rate of at least 80 Nl/l of feedstock and an hourly volumetric flow rate of 0.1–20 h$^{-1}$.

19. Process according to claim 17, in which the catalyst is previously sulfurized.

* * * * *